UNITED STATES PATENT OFFICE.

GEORGE W. BANKER, OF BROOKLYN, NEW YORK.

COMPOSITE OIL FOR LUBRICATING, &c.

SPECIFICATION forming part of Letters Patent No. 294,752, dated March 11, 1884.

Application filed July 31, 1883. (No specimens.)

*To all whom it may concern:*

Be it known that I, GEO. W. BANKER, of Brooklyn, in the county of Kings and State of New York, have invented new and valuable Improvements in Composite Oils for Lubricating, &c., of which the following is a specification.

Since the introduction of petroleum and its products for lubricants and other purposes, attempts have been made to combine such oils with castor-oil, (which for slow-running and heavy machinery is considered superior to other oils;) but no satisfactory way of combining mineral oils with castor-oil was discovered until my composite oil was produced and patented March 21, 1882, No. 255,096.

The object of my invention is to produce a composite oil as a new article of commerce with which mineral oils will combine in varying proportions, so that the consumer, being supplied with this composite oil and a mineral-oil lubricant, may combine the two in such proportions as is best adapted for slow or rapid running, light, or heavy machinery.

My discovery consists in combining corn-oil with castor-oil in nearly equal proportions.

What I claim is—

The herein-described composite oil, composed of castor-oil and corn-oil in nearly equal proportions.

GEO. W. BANKER.

Witnesses:
GEO. W. PECK,
JOHN W. BANKER.